(12) United States Patent
Ebener et al.

(10) Patent No.: US 8,071,505 B2
(45) Date of Patent: Dec. 6, 2011

(54) CATALYTIC CONVERTER SUPPORT BODY

(75) Inventors: Stefan Ebener, Sauerlach/Lochhofen (DE); Stefan Fröhlich, Ried-Zillenberg (DE)

(73) Assignee: Alantum Corporation, Sangdaewon-Dong, Joongwon-Gu, Gyonggi-Do, Seongnam (KR)

( * ) Notice: Subject to any disclaimer, the term of this patent is extended or adjusted under 35 U.S.C. 154(b) by 0 days.

(21) Appl. No.: 12/527,800

(22) PCT Filed: Feb. 22, 2008
(Under 37 CFR 1.47)

(86) PCT No.: PCT/EP2008/001443
§ 371 (c)(1),
(2), (4) Date: Aug. 19, 2009

(87) PCT Pub. No.: WO2008/101727
PCT Pub. Date: Aug. 28, 2008

(65) Prior Publication Data
US 2010/0331173 A1 Dec. 30, 2010

(30) Foreign Application Priority Data

Feb. 22, 2007 (DE) .................. 10 2007 008 823

(51) Int. Cl.
*B01J 21/04* (2006.01)
*B01J 23/02* (2006.01)
*B01D 50/00* (2006.01)
*B01D 53/34* (2006.01)

(52) U.S. Cl. ...................... 502/439; 422/180

(58) Field of Classification Search .......... 502/300–355, 502/439; 422/177, 180; 60/282, 299, 302; 428/116
See application file for complete search history.

(56) References Cited

U.S. PATENT DOCUMENTS

2001/0027165 A1 * 10/2001 Galligan et al. ............. 502/439
2007/0041881 A1 * 2/2007 Voss et al. .................... 422/177

FOREIGN PATENT DOCUMENTS

| DE | 2856030 A1 | 6/1980 |
| DE | 3743723 C1 | 4/1989 |
| DE | 10217259 A1 | 11/2003 |
| DE | 102004014076 B3 | 12/2005 |
| DE | 102005034033 A1 | 2/2007 |
| WO | 99/56853 A1 | 11/1999 |
| WO | 2004/092553 A1 | 10/2004 |

* cited by examiner

*Primary Examiner* — Stanley Silverman
*Assistant Examiner* — Anthony J Zimmer
(74) *Attorney, Agent, or Firm* — Lexyoume IP Group, PLLC.

(57) ABSTRACT

The present invention relates to a catalyst support body (100) with a longitudinal axis (103) comprising a honeycomb body (101) and a housing (102), wherein the honeycomb body (101) consists of at least three metal layers (104) arranged one above the other, which are wound with their end surfaces in each case starting from a common centre into layers lying one above the other in the form of a spiral and are secured in the sleeve of the housing (102), wherein the metal layers consist of metal-foam layers, and wherein a metal-foam layer developed as a corrugated sheath (107) is arranged between two planar metal-foam layers (105, 106), wherein attachment sections (108) on the outside of the corrugated sheath (107) connect it to the planar metal-foam layers (105, 106).

17 Claims, 2 Drawing Sheets

CATALYTIC CONVERTER SUPPORT BODY

Figure 1:
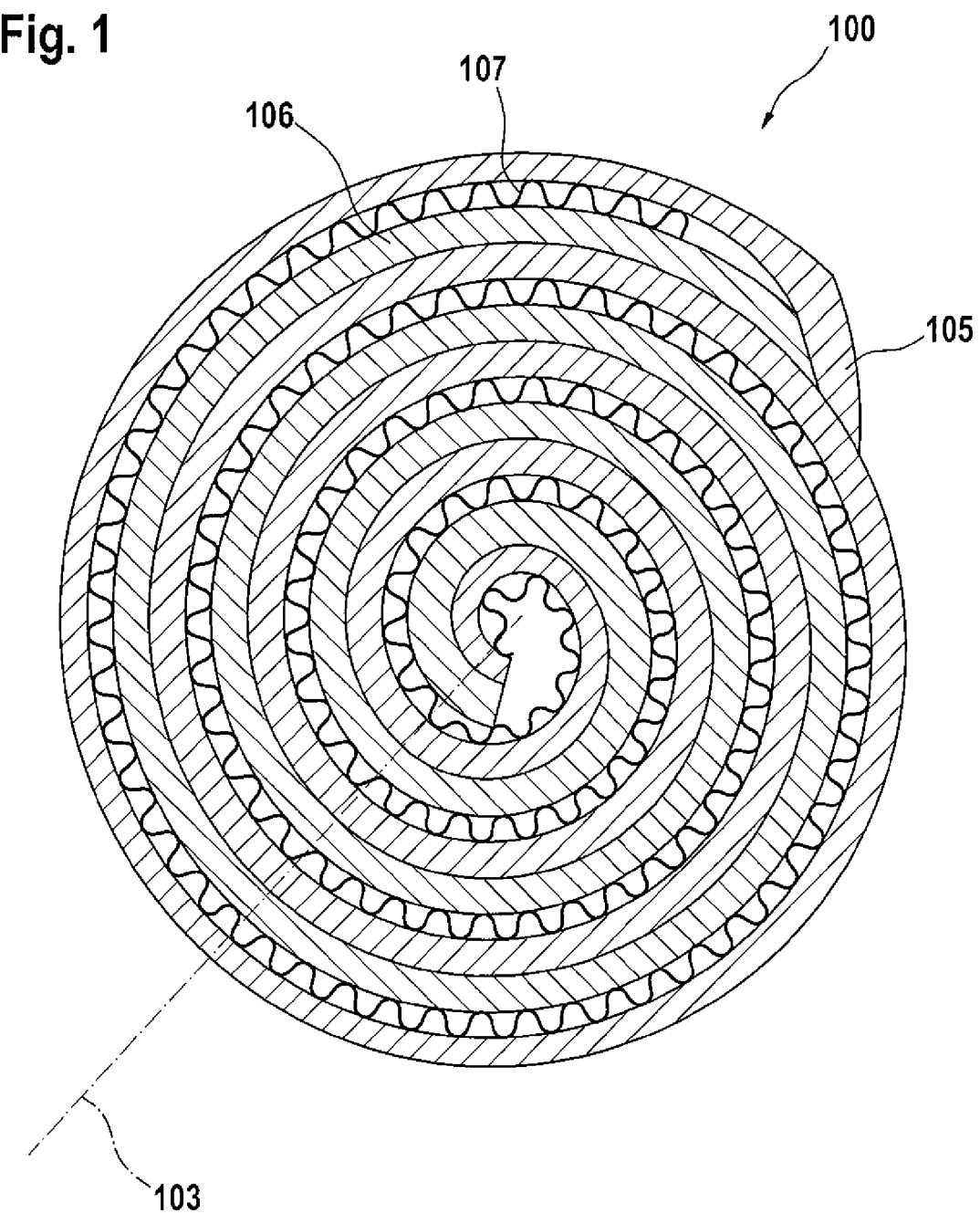

The present invention relates to catalyst support bodies comprising a honeycomb body and a housing, wherein the honeycomb body consists of at least three metal layers arranged one above the other, which are wound with their end surfaces in each case starting in a common centre into layers lying one above the other in the form of a spiral and are secured in the sleeve of the housing, and wherein the metal layers consist of a metal foam.

The most important field of use of such catalyst support bodies is currently in the cleaning of exhaust gases of diesel or spark ignition engines in automotive engineering.

Typically the honeycomb bodies used thus far have consisted of ceramic or metal materials which generally are coated with high-surface porous catalytically active metal oxides applied to the honeycomb body by means of a "washcoat" (a suspension or dispersion of the metal oxides, mostly in powder form in a liquid).

Depending on the field of use, the catalytically active layer also often contains at least one catalytically active metal, such as for example platinum, palladium, rhodium, nickel, vanadium, tungsten etc.

By catalyst is meant in the present case both so-called diesel-oxidation catalysts (DOCs), H catalysts and also SCR (selective catalytic reduction) catalysts and also three-way catalysts. If the exhaust gas comes into contact with the catalytically active material, there is a reduction in the pollutants contained in the exhaust gas, such as for example carbon monoxide, unsaturated hydrocarbons, nitrous oxides (NOx) etc.

In such a mobile exhaust-gas system the catalyst support body is exposed to high thermal and dynamic stresses.

The catalyst support bodies are usually developed in the form of a so-called honeycomb body in order to provide a relatively large surface for the support layer.

These honeycomb bodies have a number of ducts or openings through which a fluid, i.e. in particular a gas, can flow.

For example, ceramic, extruded and metallic honeycomb bodies are known which are typically introduced into a housing which in turn can be integrated directly into the exhaust pipe or can also be used in front of a diesel particle filter.

The known ceramic honeycomb bodies can be coated relatively simply with a high-surface porous carrier material by means of a washcoat, as ceramic honeycomb bodies have a relatively high surface roughness and the washcoat and thus the porous support material can stick fast to the ceramic surface.

Metallic honeycomb bodies known from the state of the art, for example from DE 10 217 259 A1, are frequently made from metal sheets or metal foils. The honeycomb bodies are produced by alternating layered structures or sheets or foils. These can be arranged alternating with one another and then bent into an S- or U-shape. Here reference may be made in particular to DE 3743723, where such metallic honeycomb bodies are described in detail. Further metallic honeycomb bodies are known for example from DE 10 2005 034033. Even more metallic honeycomb bodies and methods for their production are described in EP 049 489 A1 or in DE 2856030, reference to the entire disclosure content of which is made here.

Metal catalyst support bodies (also called "supports", "honeycomb bodies" or simply "monoliths" below) have the advantage that—compared with ceramic support bodies—they warm or heat up more quickly and thus catalysts based on metal supports generally display a better response under so-called cold-start conditions.

Moreover, metallic monoliths have an increased mechanical stability and a better shapability compared with ceramic honeycomb bodies.

The disadvantage of metallic honeycomb bodies or monoliths is in their smooth surface, with the result that, in comparison with ceramic honeycomb bodies, they are much more difficult to coat, with the result that, generally, more binder has to be used in order to achieve a sufficient adhesion of the porous carrier material to the metal surface.

High binder levels can, however, have a disadvantageous effect on the activity of a catalyst.

Therefore, the object of the present invention was to provide a metallic catalyst support body to which a porous carrier material can bond firmly using relatively little binder and which simultaneously has an increased surface in comparison with conventional metallic support bodies.

This object is achieved by a catalyst support body with a longitudinal axis containing a honeycomb body and a housing, wherein the honeycomb body consists of at least three metal layers arranged one above the other, which are wound with their end surfaces in each case starting from a common centre into layers lying one above the other in the form of a spiral and are secured in the sleeve of the housing, wherein the metal layers consist of a metal foam, and wherein a metal-foam layer developed as a corrugated sheath is arranged between two sectionally planar metal-foam layers, wherein attachment sections on the outside of the corrugated sheath connect it to the sectionally planar metal-foam layers.

Metallic foams as presently used are for example disclosed in DE 10 2004 014076, complete reference to the complete contents of which is likewise made here. It is self-evident that any other suitable metal form can likewise also be used for this purpose.

The term "metal foam" as used here thus means a foam material of any metal or any alloy of metals which can optionally contain further additives such as carbides etc., and which has a large number of pores which are connected to one another, with the result that for example a gas can be conducted through the foam material.

The foams can, as already stated, consist of pure metal or an alloy, preferably iron-chrome-nickel alloys or iron-chrome-nickel-aluminium alloys, in order to promote a good relationship between the parameters of strength, brittleness and flexibility. Other alloys known per se to a person skilled in the art can of course also be used.

Such metal foams are produced, for example, by mixing metal powder with a metal hydride which is then compressed into an ingoing material by hot pressing or extrusion. The ingoing material is then heated to a temperature above the melting point of the metal, wherein hydrogen is released from the hydride and the batch foams. Further possibilities are disclosed in the above-mentioned patent application. Moreover, for example gas can be blown into a metal melt previously made foamable by the addition of solid constituents. With aluminium alloys, stabilization is typically achieved by adding 10 to 20 vol.-% silicon carbide or aluminium oxide.

Metal foams are also produced from a metal alloy by a powder-metallurgical process. Webs consisting of pure metal foam such as for example from nickel, iron, copper, etc., produced by electrodeposition on organic foam structures, are coated with a metal powder consisting of the desired portions of alloys. A homogenous alloy is then produced by a sintering close to the melting point, wherein the structure of the previously used metal foam is preserved. This process is described for example in the German patent application DE 10 2004 014076.

Metal foams typically have a high surface and a corresponding pore distribution. These metal foams are often also called open-pore metal foams. Using such porous metal foams makes possible in particular a weight reduction of up to 80% of the catalyst support body compared with catalyst support bodies made from solid sheets or from metal and, because of the high porosity, provides a larger surface through which exhaust gases can flow. The metal foams also display a good mechanical strength which can also absorb energy even at a low voltage level. Moreover, the open-pore metal foams typically have faster heat-up rates than the metallic catalyst support bodies of the state of the art as disclosed for example in DE 10 2005 034033.

Typically the metal foams which are used in the present invention have pore densities which lie in the range 110 ppi to 45 ppi (pores per inch).

The pores of the foam structures can be described in ideal terms as pentagon dodecahedrons, the edges of which form the sections of the lattice structure. The ratio of large to small diameter of a pentagon dodecahedron is theoretically 1.6. For the lattice structure of the open-pore metal foams the large diameter varies from approx. 4 mm (10 ppi) to approx. 1 mm (45 ppi) and the small diameter from approx. 1.5 mm (10 ppi) to 0.5 mm (45 ppi).

The pressure loss when the metal flows through is proportional, at lower flow rates, to the flow rate and the distance flowed through. At a flow rate of 1 m per second the pressure loss at 10 ppi is approx. 0.5 bar per cm and at 30 ppi approx. 0.2 bar per cm, which is also a sufficiently long residence time for the catalytic reaction which is carried out in the open-pore metal foam provided with a catalytically active coating.

The use of such metal-foam layers advantageously makes possible the establishment of an increased turbulence of the gas that is passed through, with the result that the transport of material to the catalytically active coating is increased if the honeycomb body according to the invention is used in motor vehicle exhaust-gas systems.

Moreover the catalyst support according to the invention has the advantage that it is permeable to gas components in the areas with the metal-foam layer, whereby a good thorough mixing of fluids of neighbouring ducts separated by the foam material can take place.

It has also been shown that when an exhaust gas is passed through the catalyst support body according to the invention which is coated with a catalytically active component, a smaller mechanical stress acts on the washcoat, in particular on the washcoat incorporated in the metal foam. This results in a better mechanical long-term stability of the coated honeycomb body. A further advantage to the small mechanical stress is a smaller binder level in the washcoat composition, which results in a higher activity of the catalyst.

The pores and cavities give the metallic open-pore foam materials an extremely low density, but a considerable rigidity and strength.

By "sectionally planar" is meant here that only specific areas of the foam must be developed planar, but in other areas there can also be a corrugation for example. The corrugated layer is typically connected to the planar sections of the upper and lower metal-foam layers enclosing them by means of the attachment sections for example by soldering.

In developments according to the invention of the catalyst support body, the ratio of length of corrugation to height of corrugation of the corrugated sheath is 0.1:1 to 1:0.1, with the result that the duct structure through which a fluid is to be passed is optimized to meet the respective conditions and specific requirements resulting from for example gas flow, type of gas or fluid.

Typical size ranges for the length of corrugation are in the range 1.5 to 4 mm and for the height of corrugation 0.5 to 2 mm.

In further advantageous embodiments of the present invention the corrugated sheath has three-dimensional microstructures which are developed for example in the shape of paddles or small holes which trigger even more strengthening turbulences in the fluid passed through, with the result that a thorough mixing and a better catalysis can be achieved at the catalyst support body coated with a catalytic washcoat.

Depending on the field of application, the metal material of the two metal-foam layers, sectionally planar, and the metal-foam layer developed as a corrugated sheath can be the same as or different from each other. In other words e.g. the metal material of the sectionally planar metal-foam layers surrounding the corrugated sheath is the same, but different from that of the corrugated sheath. Likewise, each individual metal-foam layer can naturally consist of a different metal material.

The problem of the attachment of the corrugated layers to the two planar metal-foam layers is largely overcome by generously sized strips of solder which promote much larger attachment surfaces than are required for the mechanically secure holding of the corrugated sheath.

These attachment surfaces also extend considerably in the direction of the longitudinal axis, whereby the length available for bending the corrugated sheath is shortened, which leads to the quicker destruction of the corrugated sheath under operating conditions. The invention is of assistance because there are narrow limits to the axial broadening of the attachment sections and they are secured to the preferably small-sized planar sections. Although the total surface area of the attachment sections must not be so small that they can no longer securely hold the corrugated sheath under dynamic stress, according to the invention a reduction of up to 80% in size of the attachment sections compared with the state of the art is nevertheless made possible. These areas have a length of less than 4, even more preferably less than 2 mm.

It is further preferred that the average pore size of the metal foam is more than 450 μm-1,200 μm, preferably 800 μm-1, 200 μm.

In further preferred embodiments of the present invention the sectionally planar layers have continuous perforations, with the result that a better fluid exchange between neighbouring ducts of the catalyst support body according to the invention is achieved.

In further preferred embodiments, only the corrugated body has perforations, and in yet further preferred embodiments all the layers have continuous perforations, with the result that a particularly good fluid exchange between the ducts separated from one another is guaranteed, with the result that also the catalytic reaction also proceeds more quickly.

The corrugated layer typically has a thickness of 2 to 10 mm, quite particularly preferably 4 to 6 mm, with the result that a good compromise between thickness and mechanical strength and rigidity is achieved.

If the corrugated layer has a thickness of less than 4 mm, preferably 2 mm, it can be provided in further embodiments of the invention that the corrugated sheath can also include an insert which improves the rigidity of the corresponding open-pore metal foam, for example by attaching the metal foam to the insert. The insert is preferably made from a very thin sheet or a grid, such as for example a mesh grid of metal wire, which also guarantees the necessary rigidity and strength even with thin open-pore metal-foam layers. Naturally, this also applies accordingly for the planar metal-foam layers which surround the corrugated sheath.

Where sheets are used as an insert, the insert will also have continuous perforations, in order that the exchange of through-flowing medium between neighbouring ducts is not impaired by the metal-foam layer.

In preferred embodiments of the present invention the metal-foam layers have an average density of 1000 to 1400 g/cm², with the result that a particularly high surface available for the catalytic reaction is guaranteed. The open-pore content of the metal-foam layers is 80 to 100%.

The specific surface area is 5 to 14 mm² and the thermal conductivity lies in the range 0.5 to 0.3 W/m·K, with the result that the heat-up rates are particularly low and the catalyst also cools down quickly again after use.

The at least three-layered structure of the catalyst support body according to the invention resulting from the three different metal-foam layers also makes possible a variation of the catalytic coatings to be applied.

In preferred embodiments of the invention it can be provided that the same catalytic coating is applied to every metal-foam layer, i.e. to the sectionally planar metal-foam layers, and to the corrugation layer, but on the other hand it is equally possible in further preferred embodiments of the invention that every metal-foam layer has a different catalytic coating or, in yet another further preferred embodiment, that the two sectionally planar metal-foam layers have the same catalytic coating, and the corrugated layer a different catalytic coating. Thus a large number of potential fields of application can be opened up or the function of normally two different catalysts can be realized in a single catalyst support body.

The invention is described further in the Figures below and the following description, without these being meant as limitative.

Figure 2:
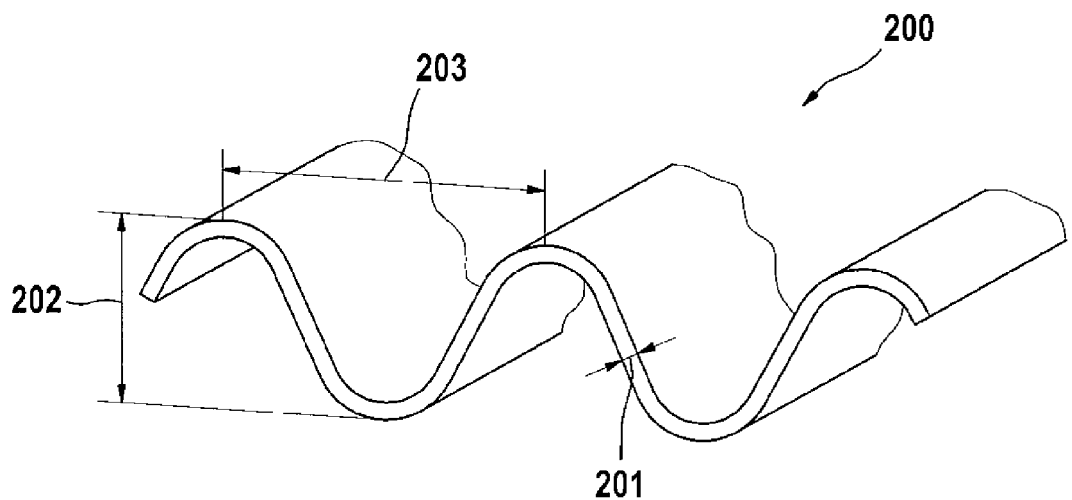

There are shown in:

FIG. 1: a detailed view of a corrugated sheath,

FIG. 2: a cross-section of a honeycomb body wound in a spiral,

FIG. 3: schematic cross-sections through differently-shaped metal-foam layers.

FIG. 1 shows a catalyst support body 100 according to the invention, wherein the housing is not shown. The honeycomb body consists of three metal layers 105, 106, 107, arranged one above the other, wherein the metal-foam layer, developed as corrugated sheath 107, is arranged between the two metal-foam layers 105, 106, which are completely planar in this case.

The three layers are wound with their end surfaces in each case starting from the common centre in the form of a spiral around the longitudinal axis 103 and secured in the sleeve of the housing which is not shown.

FIG. 2 shows schematically and perspectively a design of a corrugated sheath 200. The corrugated sheath 200 has a sheath thickness 201, and a corrugation height 202 and a corrugation length 203. The sheath thickness 201 preferably lies in the range 1,000 μm to 2,000 μm. The explicit design of the corrugation structure is always to be carried out with an eye to the expected thermal and dynamic stresses of the catalyst support body to the exhaust-gas system. For example, corrugation lengths of 1.5 to 4 mm and corrugation heights of 0.5 to 2 mm have proved advantageous.

FIG. 3 shows three different geometric design possibilities for the sectionally planar metal-foam layers, 301 and 302, and the corrugation length 303.

Figure 3A:
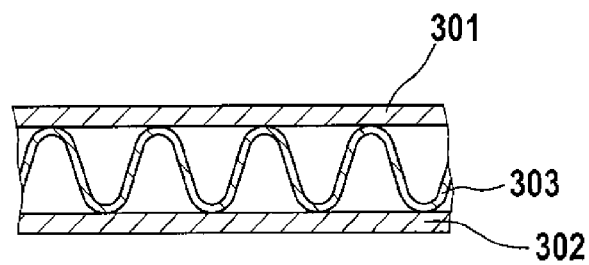
Figure 3B:
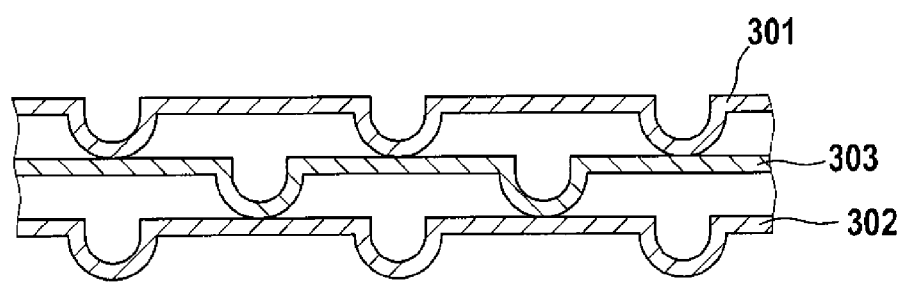
Figure 3C:
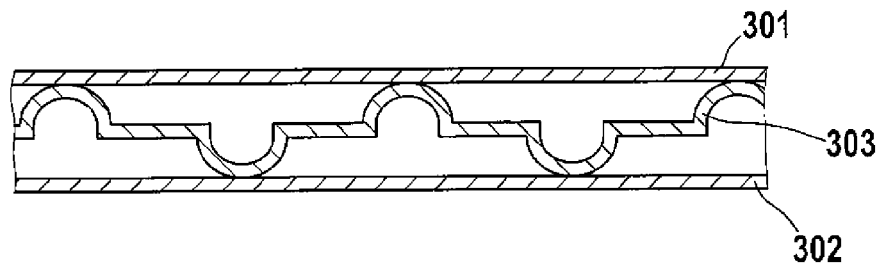

In FIGS. 3a and 3c the metal-foam layers 301 and 302 are completely planar, while in FIG. 3b they are sectionally planar and have sectional notches or corrugations.

In FIG. 3a the corrugation layer 303 can be developed either sinusoidally or likewise have sectionally planar areas, as shown in FIGS. 3b and 3c.

In a special embodiment example the metal material for the foams is an iron-nickel-chrome-aluminium alloy which has a density of 1000 to 1300 g/cm² or 0.3 to 0.9 g/cm³. The alloy is composed of the following constituents: 50% nickel, 22% iron, 22% chrome, 6% aluminium and less than 0.1% carbon (values given in percentage by weight). It is understood that other alloys and compositions can also be used, depending on the field of use.

The thickness of the individual layers preferably lies in the range 0.1 to 5 mm.

Further typical physical parameters of the metal-foam layers used according to the invention are an open-pore content of 80 to 100%, more preferably 90 to 95%.

The specific surface area which is in contact with the through-flowing gas is between 7 and 15 mm².

The invention claimed is:

1. A catalyst support body comprising:
   a longitudinal axis;
   a corrugated metal foam sheath layer that is spirally wrapped around the longitudinal axis, and that has an inside surface and an outside surface;
   a first planar metal foam sheath layer that is spirally wrapped around the longitudinal axis and that has an inside surface and an outside surface, wherein the outside surface of the corrugated metal foam sheath layer is coupled to the inside surface of the first planar metal foam sheath layer;
   a second planar metal foam sheath layer that is spirally wrapped around the longitudinal axis and that has an inside surface and an outside surface, wherein (a) the outside surface of the first planar metal foam sheath layer is coupled to the inside surface of the second planar metal foam sheath layer and (b) the inside surface of the corrugated metal foam sheath layer is coupled to the outside surface of the second planar metal foam sheath layer; and
   a sleeve housing wherein the first and second planar metal foam sheath layers comprise different materials.

2. The catalyst support body of claim 1, wherein the corrugated metal foam sheath layer has a ratio of a corrugation length to a corrugation height between 0.1:1 and about 1:0.1.

3. The catalyst support body of claim 2, wherein:
   the corrugation length is between 1.5 mm and 4 mm, and
   the corrugation height is between 0.5 mm and 2 mm.

4. The catalyst support body of claim 2, wherein three-dimensional microstructures are attached to the corrugated metal foam sheath layer.

5. The catalyst support body of claim 1, wherein:
   the first planar metal foam sheath layer and the corrugated metal foam sheath layer comprise different materials, and
   the second planar metal foam sheath layer and the corrugated metal foam sheath layer comprise different materials.

6. The catalyst support body of claim 1, wherein first and second planar metal foam sheath layers have pores with an average pore size between 450 μm and 1200 μm.

7. The catalyst support body of claim 6, wherein first and second planar metal foam sheath layers have pores with an average pore size between 800 μm and 1200 μm.

8. The catalyst support body of claim 6, wherein the first and second planar metal foam sheath layers have continuous perforations.

9. The catalyst support body of claim 6, wherein the corrugated metal foam sheath layer is perforated.

10. The catalyst support body of claim 6, wherein the corrugated metal foam sheath layer and the first and second metal foam sheath layers have continuous perforations.

11. The catalyst support body of claim 1, wherein the corrugated metal foam sheath layer has a thickness between 2 mm and 10 mm.

12. The catalyst support body of claim 11, wherein the corrugated metal foam sheath layer and the first and second planar metal foam sheath layers have a density that is between 0.3 g cm$^{-3}$ and 0.9 g cm$^{-3}$.

13. The catalyst support body of claim 12, wherein the corrugated metal foam sheath layer and the first and second planar metal foam sheath layers have an open-pore content between 80% and 100%.

14. The catalyst support body of claim 13, wherein the corrugated metal foam sheath layer and the first and second planar metal foam sheath layers have a specific surface area that is between 5 mm$^{-2}$ and 14 mm$^{-2}$.

15. The catalyst support body of claim 14, wherein the corrugated metal foam sheath layer and the first and second planar metal foam sheath layers have a thermal conductivity between 0.15 W m$^{-1}$K$^{-1}$ and 0.3 W m$^{-1}$ K$^{-1}$.

16. The catalyst support body of claim 1, wherein:
the first planar metal foam sheath layer is coated with a first catalyst layer, the second planar metal foam sheath layer is coated with a second catalyst layer, and the first and second catalyst layers comprise the same materials.

17. The catalyst support body of claim 1, wherein:
the first planar metal foam sheath layer is coated with a first catalyst layer,
the second planar metal foam sheath layer is coated with a second catalyst layer, and
the first and second catalyst layers comprise different materials.

* * * * *